UNITED STATES PATENT OFFICE.

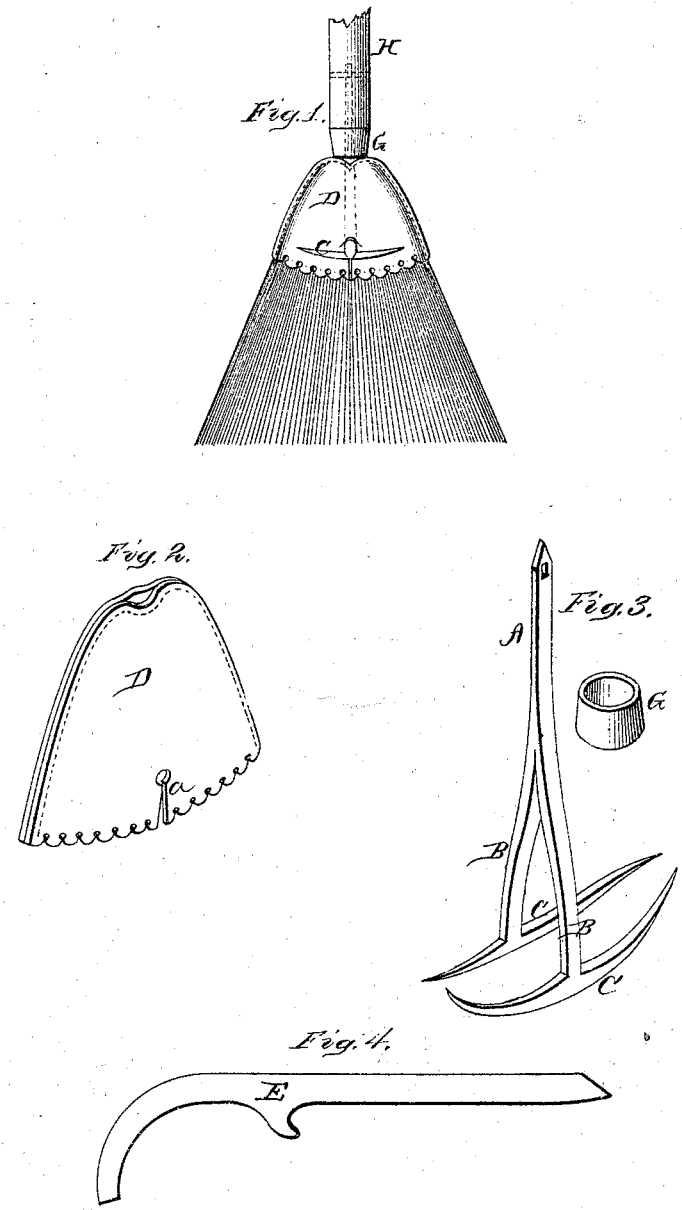

DEMUS J. OWEN AND JAMES G. BRYDGES, OF SPRINGVILLE, PA.

IMPROVEMENT IN BROOM-HEADS.

Specification forming part of Letters Patent No. 135,661, dated February 11, 1873.

*To all whom it may concern:*

Be it known that we, DEMUS J. OWEN and JAMES G. BRYDGES, of Springville, in the county of Susquehanna and State of Pennsylvania, have invented certain new and useful Improvements in Brooms; and we do hereby declare that the following is a full, clear, and exact description thereof, that will enable others skilled in the art to which it appertains to make and use the same, reference being had to the accompanying drawing and to the letters of reference marked thereon, which form a part of this specification.

Our invention is intended as an improvement upon the broom for which Letters Patent were granted to D. J. Owen, May 31, 1859; and it consists in the construction and arrangement of a steel clamp used in combination with a rubber pocket for holding and confining the material of which the broom is made, as will be hereinafter more fully set forth.

In order to enable others skilled in the art to which our invention appertains to make and use the same, we will now proceed to describe its construction and operation, referring to the annexed drawing, in which—

Figure 1 is a side view of our improved broom completed; Fig. 2 is a perspective view of the rubber pocket; Fig. 3 is a similar view of the clamp; and Fig. 4 is a side view of a tool used in the manufacture of our brooms.

A represents the shank of our clamp, from which two spring-arms, B B, diverge for a suitable distance, and on the outer end of each arm is formed a curved jaw, C. D represents the pocket or case of rubber, made of two pieces, sewed or otherwise fastened together at the edges, and having at the lower edge on each side in the center a slot, $a$, as seen in Fig. 2. The clamp is passed with its shank and arms through the rubber case, the lower ends of the arms projecting through the slots $a$, and the jaws C C extending across the pocket on the outside. The lever E, constructed as shown in Fig. 4, is used to hold the clamp open wide enough to fill in the broom-corn, wood-splits, or other sweeping material of which the broom is to be made, and when the head is filled and the lever removed the clamp will hold the said material and make a large and strong broom.

Anybody can readily remove the sweeping material, and in a few moments insert new, and thus construct another broom.

The shank A of the clamp is inserted in the end of a handle, H, and held by means of a ferrule, G, on the end of the same.

We do not confine ourselves, in the manufacture of the case D, to rubber, as it may, of course, be made of canvas, leather, or other suitable material.

Having thus fully described our invention, what we claim as new, and desire to secure by Letters Patent, is—

The self-fastening clamp, consisting of the shank A, diverging spring-arms B B, and curved jaws C C formed in one piece, and pocket D, all constructed and arranged substantially as and for the purpose specified.

In testimony that we claim the foregoing we have hereunto set our hands.

DEMUS J. OWEN.
JAMES G. BRYDGES.

Witnesses:
W. R. MESEROLE,
P. E. BRUSH.